US010750087B2

(12) United States Patent
Takada et al.

(10) Patent No.: US 10,750,087 B2
(45) Date of Patent: Aug. 18, 2020

(54) IMAGE PROCESSING SYSTEM, IMAGE PROCESSING METHOD, AND COMPUTER-READABLE MEDIUM

(71) Applicants: Masato Takada, Kanagawa (JP); Makoto Shohara, Tokyo (JP); Hidekazu Suzuki, Saitama (JP); Koui Sagawa, Saitama (JP)

(72) Inventors: Masato Takada, Kanagawa (JP); Makoto Shohara, Tokyo (JP); Hidekazu Suzuki, Saitama (JP); Koui Sagawa, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 31 days.

(21) Appl. No.: 16/135,397

(22) Filed: Sep. 19, 2018

(65) Prior Publication Data

US 2019/0020818 A1 Jan. 17, 2019

Related U.S. Application Data

(63) Continuation of application No. PCT/JP2016/088958, filed on Dec. 27, 2016.

(30) Foreign Application Priority Data

Mar. 22, 2016 (JP) .................... 2016-057354

(51) Int. Cl.
*H04N 7/00* (2011.01)
*H04N 5/232* (2006.01)
(Continued)

(52) U.S. Cl.
CPC .......... *H04N 5/23238* (2013.01); *G06T 3/00* (2013.01); *G06T 3/0018* (2013.01);
(Continued)

(58) Field of Classification Search
CPC .......... H04N 5/23293; H04N 5/23241; H04N 5/265; H04N 5/225; H04N 5/23232;
(Continued)

(56) References Cited

U.S. PATENT DOCUMENTS 6,717,608 B1 * 4/2004 Mancuso .............. G06T 3/4038
345/427
8,391,640 B1 3/2013 Jin
(Continued)

FOREIGN PATENT DOCUMENTS

JP 2008-048022 2/2008
JP 2011-234172 11/2011
(Continued)

OTHER PUBLICATIONS

Extended European Search Report for 16895550.8 dated Jan. 7, 2019.
(Continued)

*Primary Examiner* — Gims S Philippe
(74) *Attorney, Agent, or Firm* — IPUSA, PLLC

(57) ABSTRACT

An image processing system is provided that includes an image capturing apparatus configured to generate a plurality of captured images and at least one information processing apparatus connected to the image capturing apparatus. The information processing apparatus includes processing circuitry configured to input at least a first captured image and a second captured image from among the plurality of captured images, acquire first conversion data to be used for converting the first captured image and second conversion data to be used for converting the second captured image, and generate an output image by stitching converted images generated by converting the first captured image based on the first conversion data and the second captured image based on the second conversion data.

11 Claims, 16 Drawing Sheets

(51) Int. Cl.
*H04N 5/265* (2006.01)
*H04N 5/225* (2006.01)
*G06T 3/00* (2006.01)
*G06T 3/40* (2006.01)

(52) U.S. Cl.
CPC ........... *G06T 3/4038* (2013.01); *H04N 5/225* (2013.01); *H04N 5/23232* (2013.01); *H04N 5/265* (2013.01)

(58) Field of Classification Search
CPC ....... G06T 3/4038; G06T 3/00; G06T 3/0018; G06K 9/32
USPC .............................. 345/427; 382/284; 348/36
See application file for complete search history.

(56) References Cited

U.S. PATENT DOCUMENTS

| | | | |
|---|---|---|---|
| 9,307,144 B2 | 4/2016 | Tanaka et al. | |
| 9,392,167 B2 | 7/2016 | Shohara et al. | |
| 9,491,357 B2 | 11/2016 | Shohara et al. | |
| 9,584,694 B2 | 2/2017 | Ito et al. | |
| 9,596,408 B2 | 3/2017 | Tanaka et al. | |
| 9,607,358 B2 | 3/2017 | Takenaka et al. | |
| 9,756,243 B2 | 9/2017 | Shohara et al. | |
| 2003/0194149 A1* | 10/2003 | Sobel | G06K 9/32 382/284 |
| 2012/0050327 A1 | 3/2012 | Takekoshi | |
| 2013/0235149 A1 | 9/2013 | Tanaka et al. | |
| 2013/0265449 A1 | 10/2013 | Yoneda | |
| 2014/0071227 A1 | 3/2014 | Takenaka et al. | |
| 2014/0078247 A1 | 3/2014 | Shohara et al. | |
| 2015/0302561 A1* | 10/2015 | Pekkucuksen | G06T 5/006 382/275 |
| 2016/0050369 A1 | 2/2016 | Takenaka et al. | |
| 2017/0019595 A1* | 1/2017 | Chen | H04N 5/23293 |
| 2017/0061703 A1* | 3/2017 | Ryu | G06T 3/4038 |
| 2017/0126985 A1* | 5/2017 | Orner | H04L 12/42 |
| 2017/0230585 A1* | 8/2017 | Nash | H04N 5/23241 |
| 2017/0230587 A1* | 8/2017 | Kanai | H04N 5/265 |

FOREIGN PATENT DOCUMENTS

| | | |
|---|---|---|
| JP | 2012-050515 | 3/2012 |
| JP | 2013-219617 | 10/2013 |
| JP | 2015-046051 | 3/2015 |
| JP | 5842886 | 1/2016 |

OTHER PUBLICATIONS

International Search Report dated Mar. 7, 2017 in PCT Application No. PCT/JP2016/088958 filed on Dec. 27, 2016.

* cited by examiner (A)

(B)

(C)

IMAGE PROCESSING SYSTEM, IMAGE PROCESSING METHOD, AND COMPUTER-READABLE MEDIUM

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/088958 filed on Dec. 27, 2016 and designating the U.S., which claims priority to Japanese Patent Application No. 2016-057354 filed on Mar. 22, 2016. The entire contents of the foregoing applications are incorporated herein by reference.

BACKGROUND OF THE INVENTION

1. Field of the Invention

The present invention relates to an image processing system, an image processing method, and a program.

2. Description of the Related Art

Methods for stitching a plurality of images to generate one image are known.

For example, an image processing apparatus is known that first detects a stitching position of a plurality of images and corrects conversion data based on the detection result. Then, the image processing apparatus converts the corrected conversion data by rotating coordinates to generate conversion data for image synthesis. In this way, the image processing apparatus implements a method for stitching a plurality of captured images with high accuracy even when a lens optical system having large distortion is used (see, e.g., Japanese Patent No. 5842886).

However, improving accuracy in stitching a plurality of images using conventional methods is rather limited.

SUMMARY OF THE INVENTION

One aspect of the present invention is directed to improving accuracy in stitching a plurality of images.

According to one embodiment of the present invention, an image processing system is provided that includes an image capturing apparatus configured to generate a plurality of captured images and at least one information processing apparatus connected to the image capturing apparatus. The information processing apparatus includes processing circuitry configured to input at least a first captured image and a second captured image from among the plurality of captured images, acquire first conversion data to be used for converting the first captured image and second conversion data to be used for converting the second captured image, and generate an output image by stitching converted images generated by converting the first captured image based on the first conversion data and the second captured image based on the second conversion data.

DESCRIPTION OF THE EMBODIMENTS

In the following, embodiments of the present invention will be described. First, an image capturing apparatus included in an image processing system according to an embodiment of the present invention will be described.

<Omnidirectional Camera Example>

Figure 1:
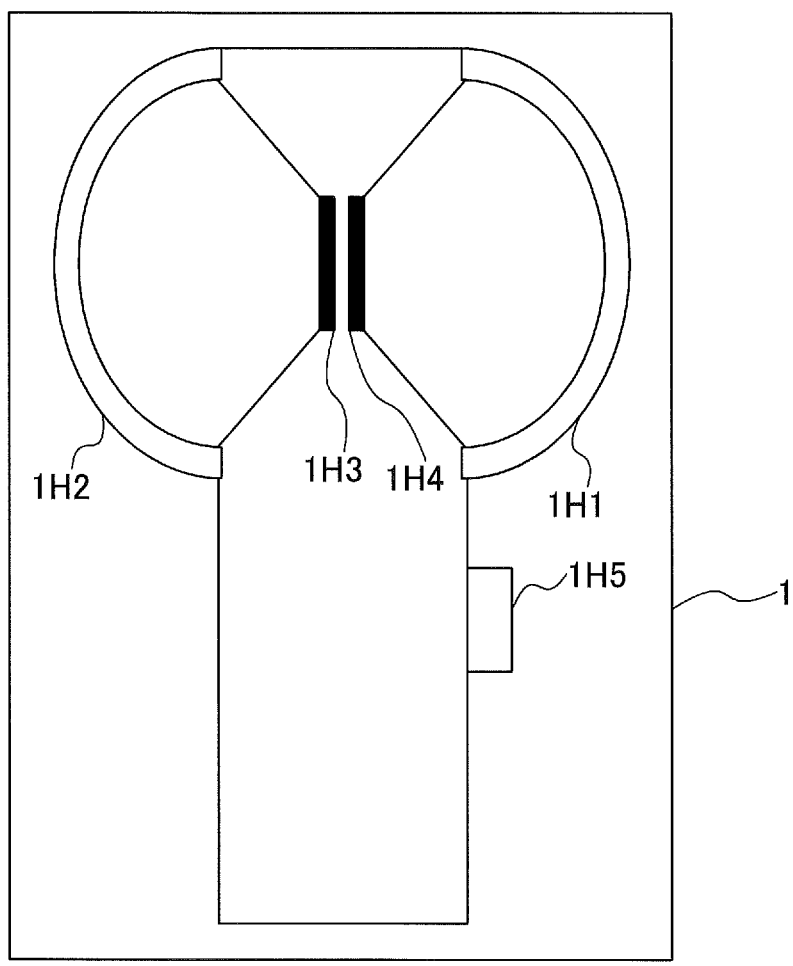
FIG. 1 is a first external view of an image capturing apparatus according to an embodiment of the present invention.
Figure 2:
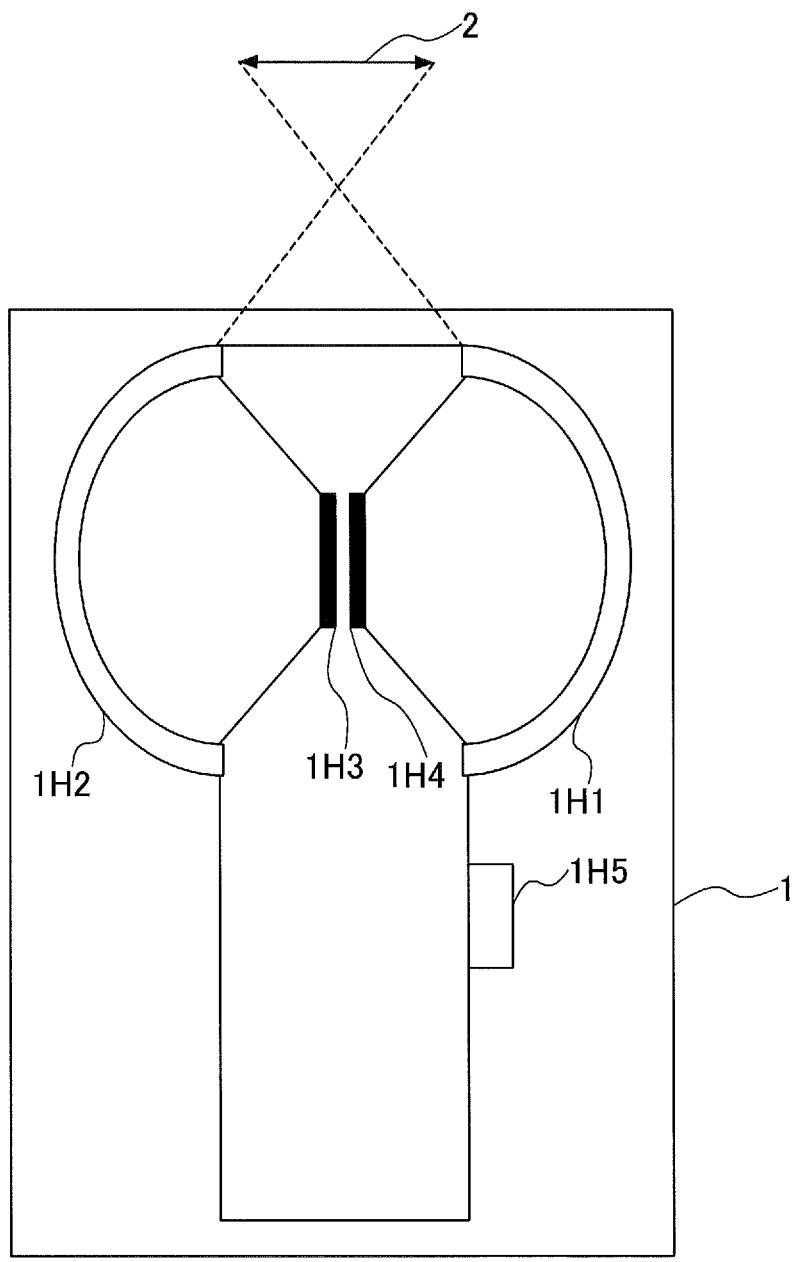
FIG. 2 is a second external view of the image capturing apparatus according to an embodiment of the present invention.

FIGS. 1 and 2 are external views of an example image capturing apparatus according to an embodiment of the present invention. For example, the image capturing apparatus may be an omnidirectional camera 1 as illustrated in FIGS. 1 and 2. In the following, an example case where the omnidirectional camera 1 is used as an image capturing apparatus will be described. Note that the omnidirectional camera 1 is an apparatus that captures an image covering a wide range, such as a 360° range, from an image capturing position.

Specifically, FIG. 1 is an external view of the example image capturing apparatus. As illustrated in FIG. 1, the omnidirectional camera 1 includes a lens 1H1, a lens 1H2, a first image capturing element 1H3, a second image capturing element 1H4, and a switch 1H5. Note that the omnidirectional camera 1 may include three or more optical systems each including an image capturing element and a lens, for example. In the following, an example where the omnidirectional camera 1 includes two image capturing elements and two lenses will be described.

The lens 1H1 and the lens 1H2 may each be a so-called fisheye lens or a wide-angle lens having an angle of view greater than or equal to 180°, for example.

The first image capturing element 1H3 and the second image capturing element 1H4 convert light incident thereon by the lens 1H1 and the lens 1H2 into electric signals to generate captured images. That is, the first image capturing element 1H3 and the second image capturing element 1H4 may be CCD (Charge Coupled Device) image sensors or CMOS (Complementary Metal Oxide Semiconductor) image sensors, for example. In the following, a captured image output by the omnidirectional camera 1 based on an image captured by the first image capturing element 1H3 is referred to as "first captured image". On the other hand, a captured image output by the omnidirectional camera 1 based on an image captured by the second image capturing element 1H4 is referred to as "second captured image". Note that the first captured image and the second captured image may be images subjected to image processing, such as image correction, after being captured by the first and second image capturing elements 1H3 and 1H4, for example.

The switch 1H5 is a device for enabling the user to perform an operation constituting a trigger for causing the omnidirectional camera 1 to start various processes. Note that the manner of using the switch 1H5 will be described in detail below.

FIG. 2 is a diagram illustrating an example of an overlapping region 2 according to an embodiment of the present invention. As illustrated in FIG. 2, the overlapping region 2 may correspond to a region captured by both the first image capturing element 1H3 and the second image capturing element 1H4, for example. In other words, an object located in the overlapping region 2 will be captured in both the first captured image and the second captured image.

When the switch 1H5 is pressed, the omnidirectional camera 1 causes the first image capturing element 1H3 and the second image capturing element 1H4 to perform exposure and capture images.

Note that in an example overall system configuration described below, the omnidirectional camera 1 includes a network I/F (interface) or the like, and the omnidirectional camera 1 is connected to an information processing apparatus such as a PC (Personal Computer). That is, an image processing system according to an embodiment of the present invention includes the omnidirectional camera 1 and an information processing apparatus. For example, in the image processing system, a plurality of captured images generated by the omnidirectional camera 1 may be transmitted to the information processing apparatus, and the information processing apparatus may perform image processing on the captured images transmitted from the omnidirectional camera 1. The omnidirectional camera 1 may have a hardware configuration as described below, for example.

<Omnidirectional Camera Hardware Configuration Example>

Figure 3:
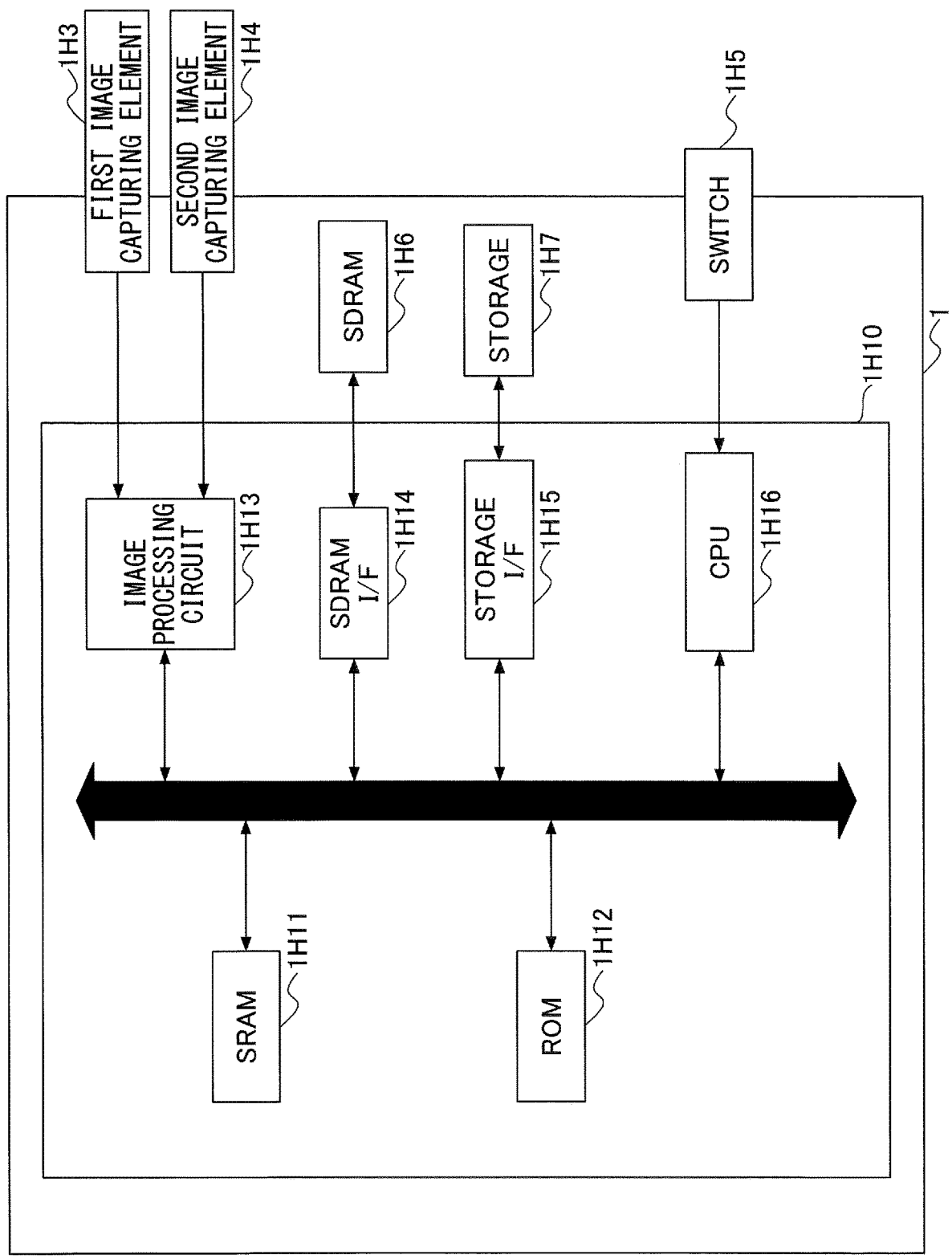
FIG. 3 is a block diagram illustrating an example hardware configuration of the image capturing apparatus according to an embodiment of the present invention.

FIG. 3 is a block diagram illustrating an example hardware configuration of the image capturing apparatus according to an embodiment of the present invention. For example, in addition to the hardware elements illustrated in FIGS. 1 and 2, the omnidirectional camera 1 may include a controller 1H10, a SDRAM (Synchronous Dynamic Random Access Memory) 1H6, and a storage 1H7.

The controller 1H10 includes a SRAM (Static Random Access Memory) 1H11, a ROM (Read-Only Memory) 1H12, and an image processing circuit 1H13. The controller 1H10 also includes an SDRAM I/F (interface) 1H14, a storage I/F 1H15, and a CPU (Central Processing Unit) 1H16. The first image capturing element 1H3 and the second image capturing element 1H4 are connected to the image processing circuit 1H13. Further, the SDRAM 1H6 is connected to the SDRAM I/F 1H14. Further, the storage 1H7 is connected to the storage I/F 1H15. Further, the switch 1H5 is connected to the CPU 1H16.

The SRAM 1H11 and the ROM 1H12 are storage devices. The SRAM 1H11 stores various data including programs used by the CPU 1H16 and intermediate data, for example.

The image processing circuit 1H13 inputs a captured image and performs image correction processes such as white balance on the input image. The image processing circuit 1H13 may be implemented by an ASIC (Application Specific Integrated Circuit) or a PLD (Programmable Logic Device), for example.

The SDRAM I/F 1H14 is an interface for inputting/outputting data to/from the SDRAM 1H6. The SDRAM 1H6 is a storage device that stores various data. The SDRAM I/F 1H14 inputs and outputs various data such as image data to be used by the CPU 1H16 and the image processing circuit 1H13, for example.

The storage I/F 1H15 is an interface for inputting/outputting data to/from the storage 1H7. The storage 1H7 is a storage device that stores various data. For example, the storage I/F 1H15 may store data representing an image processed by the image processing circuit 1H13 in the storage 1H7.

The CPU 1H16 is a computing device and a control device that performs computations for implementing processes and controls hardware of the omnidirectional camera 1. Note that the omnidirectional camera 1 may have a hardware configuration including an internal or external computing device configured to implement all or a part of its processes, for example.

Also, the lens of the omnidirectional camera 1, namely, the lens 1H1 and the lens 1H2 illustrated in FIG. 1, may have a configuration as described below, for example.

Figure 4:
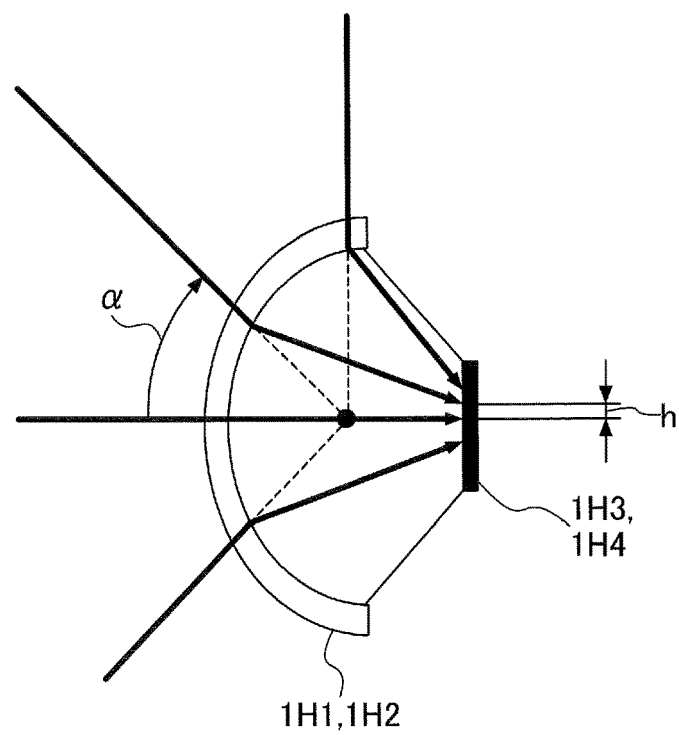
FIG. 4 is a first diagram illustrating a fish-eye lens according to an embodiment of the present invention.
Figure 5:
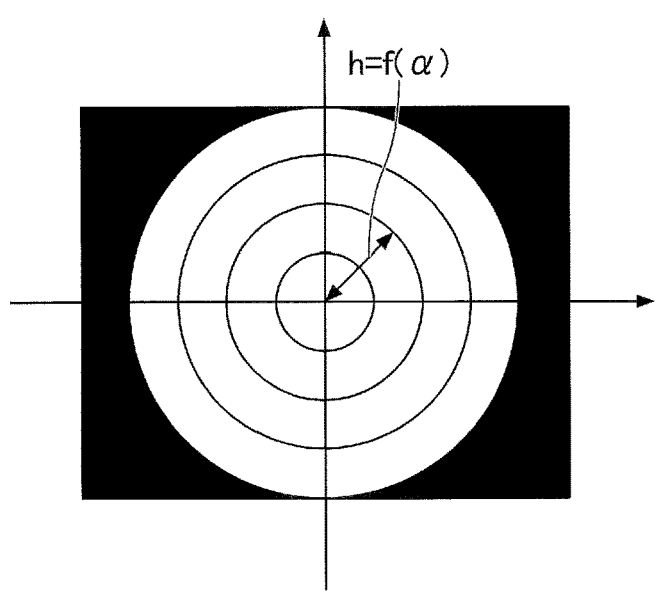
FIG. 5 is a second diagram illustrating the fish-eye lens according to an embodiment of the present invention.

FIGS. 4 and 5 are diagrams illustrating an example fisheye lens according to an embodiment of the present invention. Specifically, FIG. 4 is a cross-sectional view of the lenses 1H1 and 1H2 indicating an example relationship between the incidence angle and the image height in a fisheye lens configuration according to an embodiment of the present invention. FIG. 5 is a plan view indicating an example relationship between the incidence angle and the image height in the fisheye lens configuration according to the present embodiment. Note that in FIG. 5, blackened regions represent example regions where no light is incident. In the following, an example case where the lenses 1H1 and 1H2 are fisheye lenses will be described by referring to the lens 1H1 as an example.

The lens 1H1 may be used to capture an image covering a range of a hemisphere from the image capturing position of the omnidirectional camera 1. It is assumed below that incidence angle α represents the incidence angle of light incident on the lens 1H1, image height h represents the distance from the image center to the position at which the incident light at the incidence angle α forms an image, and projection function f(α) represents a function expressing the relationship between the incidence angle α and the image height h. The projection function f(α) varies from lens to lens depending on the properties and specification of the lens 1H1. For example, if the lens 1H1 is an equidistant projection lens, the projection function f(α) will be a function expressing a proportional relationship between the image height h and the incidence angle α. In the following, a case where the lens 1H1 is an equidistant projection lens will be described as an example.

<Overlapping Region Example>

Figure 6:
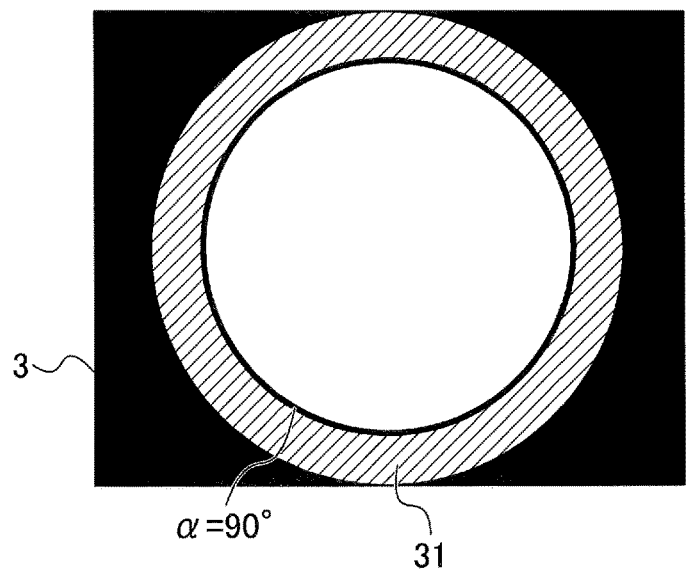
FIG. 6 is a first diagram illustrating an overlapping region according to an embodiment of the present invention.
Figure 7:
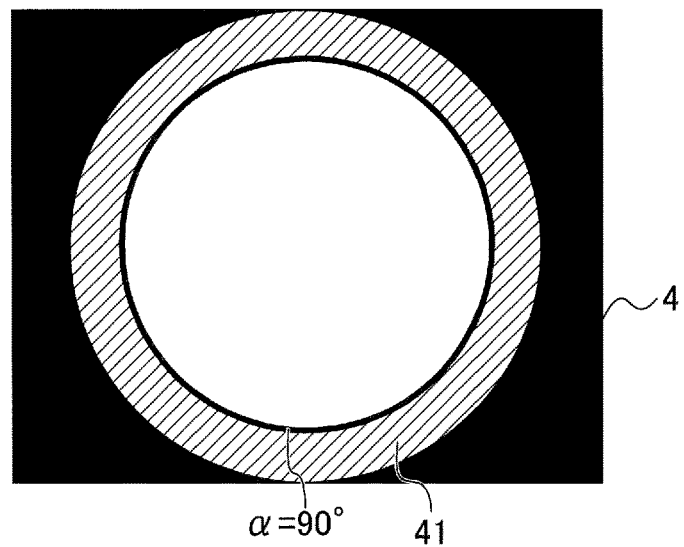
FIG. 7 is a second diagram illustrating the overlapping region according to an embodiment of the present invention.

FIGS. 6 to 9 are diagrams illustrating an example overlapping region according to an embodiment of the present invention. Note that in FIGS. 6 to 9, a case where a first image 3 and a second image 4 correspond to images captured by the first and second image capturing elements 1H3 and 1H4 will be described as an example. Also, as in FIG. 5, blackened regions in FIGS. 6 to 9 represent example regions where no light is incident. Also, the first image 3 and the second image 4 each include pixels that represent the overlapping region 2 (FIG. 2). For example, as illustrated in FIGS. 6 to 9, the overlapping region 2 may be captured at an incidence angle α greater than or equal to 90°. Specifically, in the first image 3, the overlapping region 2 may correspond to a first range 31 as illustrated in FIG. 6, for example. Similarly, in the second image 4, the overlapping region 2 may correspond to a second range 41 as illustrated in FIG. 7, for example. As described above, the overlapping region 2 may correspond to a captured range in each image that is at the outer side of pixels corresponding to an incident angle α of 90°, for example.

In the following, it is assumed that the first image 3 includes a first pixel representing the overlapping region 2. The first pixel may be a pixel in the first range 31, for example. Similarly, it is assumed that the second image 4 includes a second pixel representing the overlapping region 2. The second pixel may be a pixel in the second range 41, for example. When stitching the above images, the first pixel and the second pixel may be used to calculate a stitching position, for example. Note that the ranges used to calculate the stitching position of the images do not necessarily have to be the entire ranges of the first range 31 and the second range 41. Specifically, the following ranges may be used to calculate the stitching position of the images, for example.

Figure 8:
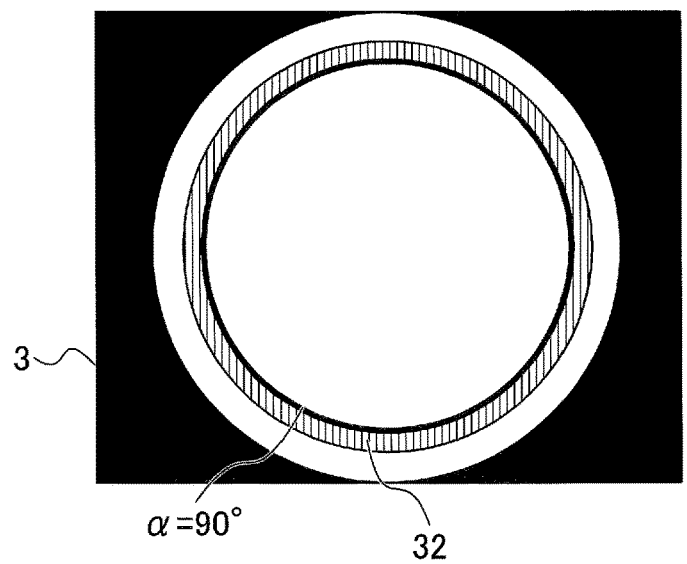
FIG. 8 is a third diagram illustrating the overlapping region according to an embodiment of the present invention.
Figure 9:
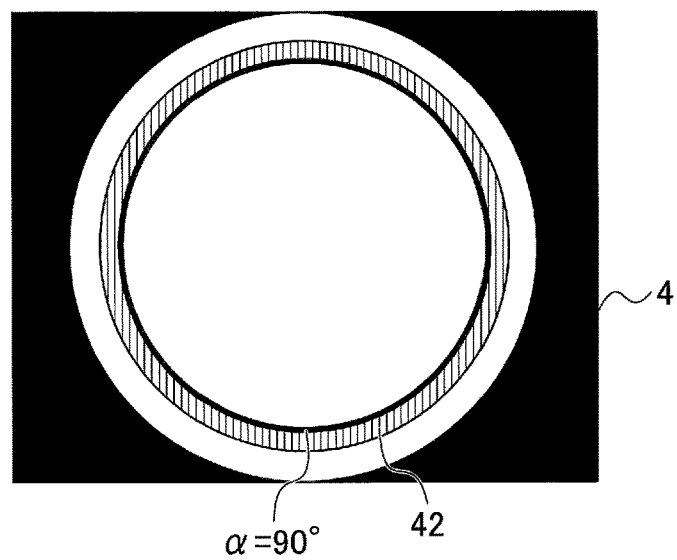
FIG. 9 is a fourth diagram illustrating the overlapping region according to an embodiment of the present invention.

FIGS. 8 and 9 are diagrams illustrating an example overlapping region used in implementing various processes on captured images according to an embodiment of the present invention. As illustrated in FIGS. 8 and 9, the ranges used to calculate the stitching position of images may be parts of the first range 31 and the second range 41. For example, a first use range 32 is a part of the first range 31, and the first use range 32 is an example of a part of the first range 31 that may be used in a process such as calculating a stitching position for stitching images. Similarly, a second use range 42 is a part of the second range 41, and the second use range 42 is an example of a part of the second range 41 that may be used in a process such as calculating a stitching position for stitching images. Also, each of the above images tend to exhibit greater distortion, aberrations, and the like as the image height h increases; namely, pixels positioned at the outer range of the image tend to exhibit greater distortion, aberrations, and the like.

In this respect, the first use range 32 and the second use range 42 are preferably limited to parts of the first range 31 and the second range 41 with the image height h in a lower range. That is, an information processing apparatus or the like can calculate a stitching position for stitching images with higher accuracy using the first use range 32 and the second use range 42 that have less distortion, aberrations, and the like.

In the following, an information processing apparatus that is connected to the omnidirectional camera 1 corresponding to an example of an image capturing apparatus via a network, cable, or the like will be described. For example, an image processing system 10 according to an embodiment of the present invention may include an image capturing apparatus and an information processing apparatus that has the following software configuration.

<Software Configuration Example>

Figure 10:
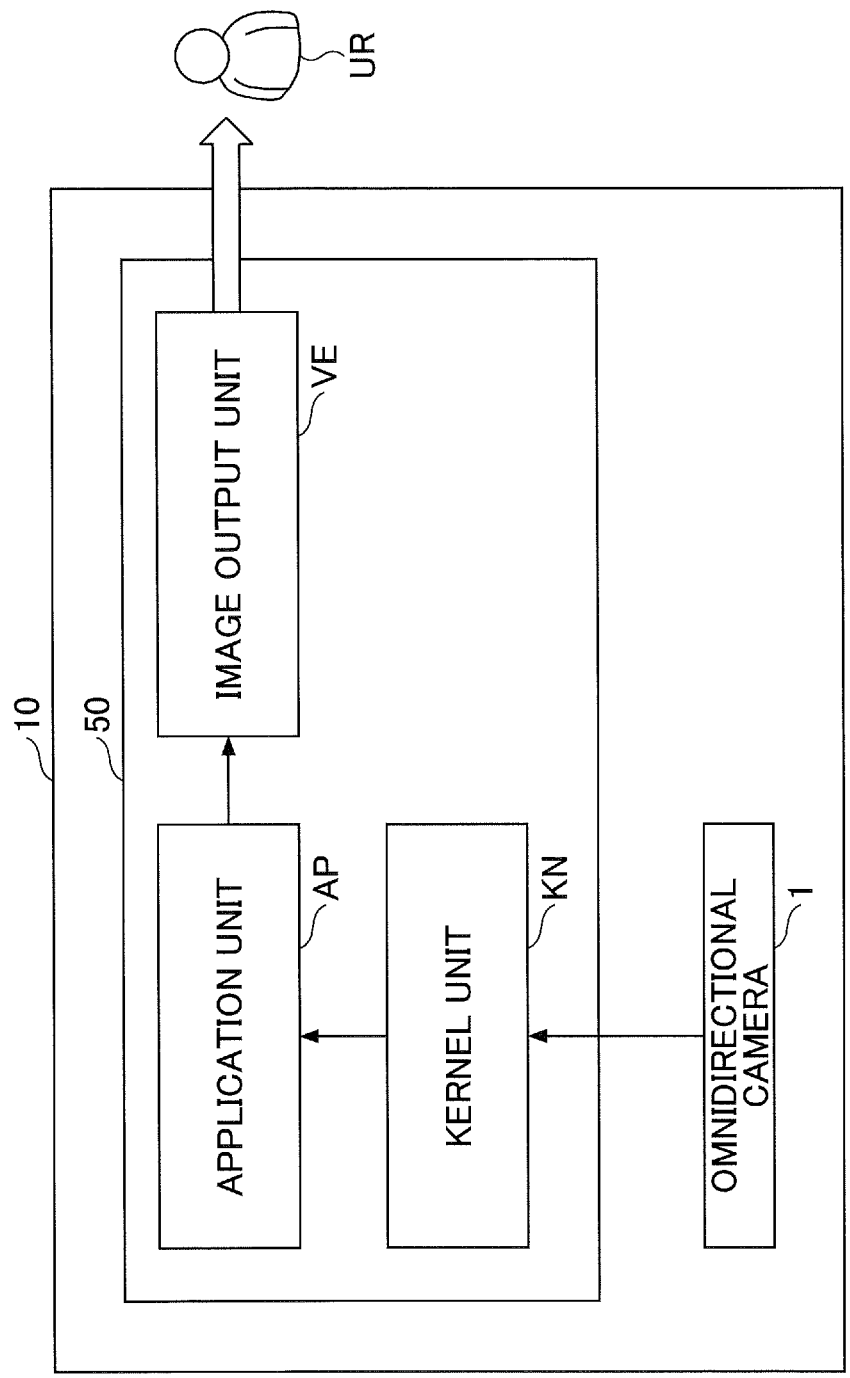
FIG. 10 is a block diagram illustrating an example software configuration of an information processing apparatus of an image processing system according to an embodiment of the present invention.

FIG. 10 is a block diagram illustrating an example software configuration of an information processing apparatus included in an image processing system according to an embodiment of the present invention. In the following, a PC 50 will be described as an example of an information processing apparatus having the software configuration as illustrated in FIG. 10. Specifically, the PC 50 may include a kernel unit KN configured by an OS (Operating System), for example. Also, the PC 50 may include an application unit AP configured by image processing application software that is installed in the PC 50 in advance. Further, the PC 50 may include an image output unit VE configured by so-called viewer application software that is installed in the PC 50 in advance.

For example, the kernel unit KN may be implemented by a USB (Universal Serial Bus) driver, for example. That is, in the image processing system 10, the kernel unit KN connects the omnidirectional camera 1 and the PC 50 to each other via an interface such as a USB to enable input/output of data to/from the PC 50 and the omnidirectional camera 1. Further, the kernel unit KN transmits data input thereto from the omnidirectional camera 1 to the application unit AP.

The application unit AP performs image processing on a captured image input to the kernel unit KN from the omnidirectional camera 1 and generates an output image to be displayed by the image output unit VE to a user UR. Note that the image processing performed on the captured image will be described in detail below.

The image output unit VE displays the output image generated by the application unit AP to the user UR. Further, the image output unit VE may input an operation by the user UR via a GUI (Graphical User Interface) or the like. For example, the image output unit VE may prompt the user UR to input a setting value relating to image processing such as image stitching. Further, the image output unit VE may transmit the input setting value to the application unit AP. In this way, a setting value to be used by the application unit AP for image processing may be input. Note that the setting value relating to image processing and the like will be described in detail below. Further, the GUI for inputting the setting value is not limited to being displayed by the image output unit VE. That is, the GUI may be displayed by some other software, for example.

<Information Processing Apparatus Hardware Configuration Example>

Figure 11:
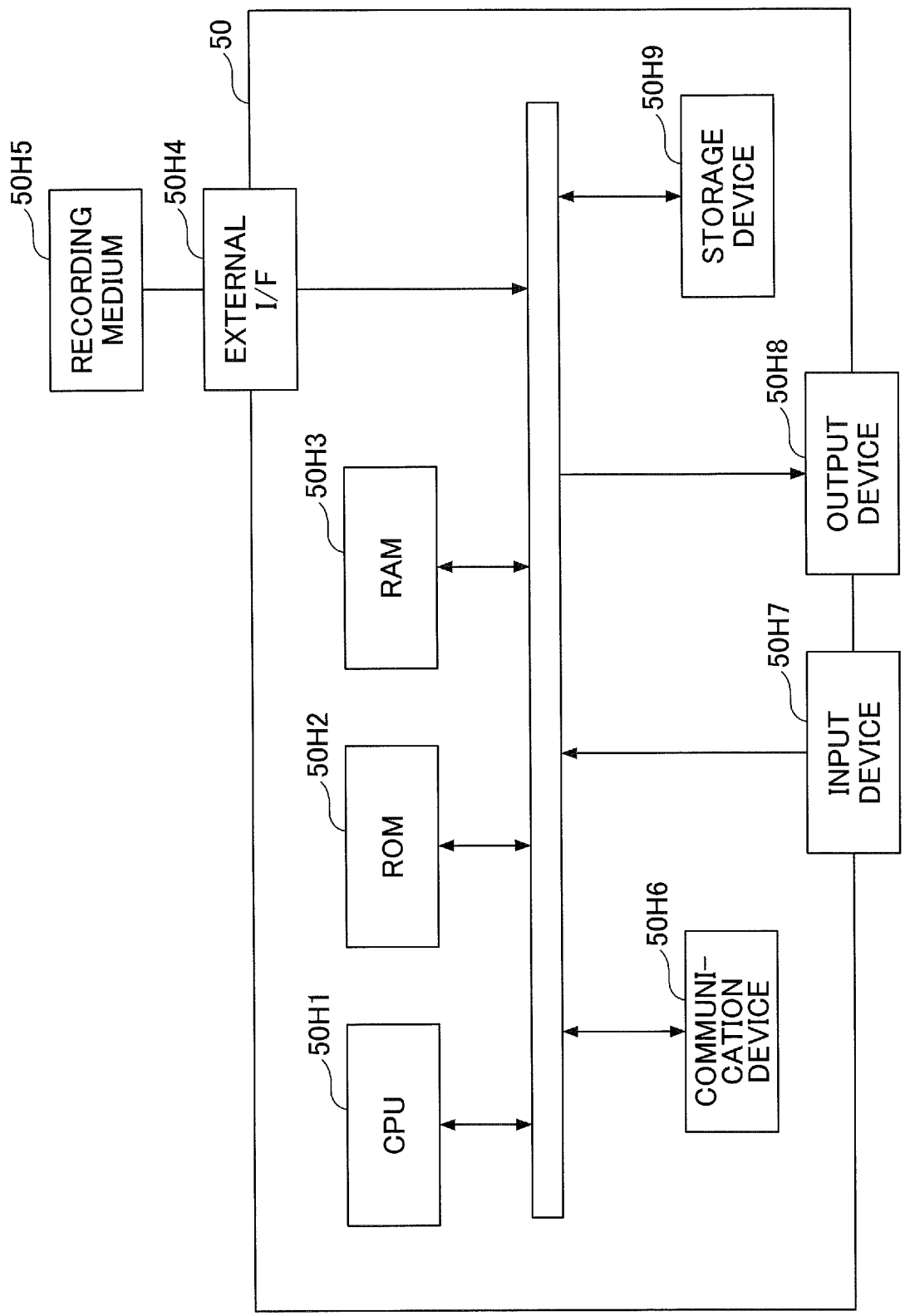
FIG. 11 is a block diagram illustrating an example hardware configuration of the information processing apparatus according to an embodiment of the present invention.

FIG. 11 is a block diagram illustrating an example hardware configuration of the information processing apparatus according to an embodiment of the present invention. For example, the PC 50 may be a computer having a hardware configuration as described below.

In FIG. 11, the PC 50 includes a CPU (Central Processing Unit) 50H1, a ROM (Read-Only Memory) 50H2, and a RAM (Random Access Memory) 50H3. Further, the PC 50 includes an external I/F (interface) 50H4, a communication device 50H6, an input device 50H7, an output device 50H8, and a storage device 50H9.

The CPU 50H1 is a computing device and a control device that performs computations and data processing for executing processes and controls hardware of the PC 50.

The ROM 50H2 is a storage device that stores programs such as firmware.

The RAM 50H3 is a storage device that is used as a work area for performing computations and the like.

The external I/F 50H4 is an interface for inputting/outputting files and the like to/from a recording medium 50H5 such as a USB memory that is connected thereto. For example, the external I/F 50H4 may be a connector, a cable, a driver, or the like.

The communication device 50H6 is a device that communicates with an external apparatus such as a printer PR1 via a network or the like. For example, the communication device 50H6 may be a connector, a cable, a driver, or the like.

The input device 50H7 is an interface for inputting an operation by a user and data from an external apparatus that is connected to the PC 50. For example, the input device 50H7 may be a keyboard, a mouse, or combination thereof. Further, the input device 50H7 may include a connector, a driver, or the like for connecting an external apparatus, such as a keyboard or an image capturing apparatus, to the PC 50, for example.

The output device 50H8 is an interface for displaying information to the user and outputting data to an external apparatus that is connected to the PC 50. For example, the output device 50H8 may be a display or the like. Further, the output device 50H8 may include a connector, a driver, or the like for connecting a display to the PC 50, for example.

The storage device 50H9 stores input data, programs, and the like. The storage device 50H9 may include a main storage device, an auxiliary storage device, and the like.

Note that the hardware configuration of the information processing apparatus is not limited to the illustrated configuration. For example, the hardware configuration may further include a computing device, a control device, a storage device, or the like as additional internal or external components. Further, the information processing apparatus may be configured by a plurality of apparatuses instead of a single apparatus, for example.

<Overall Process Example>

Figure 12:
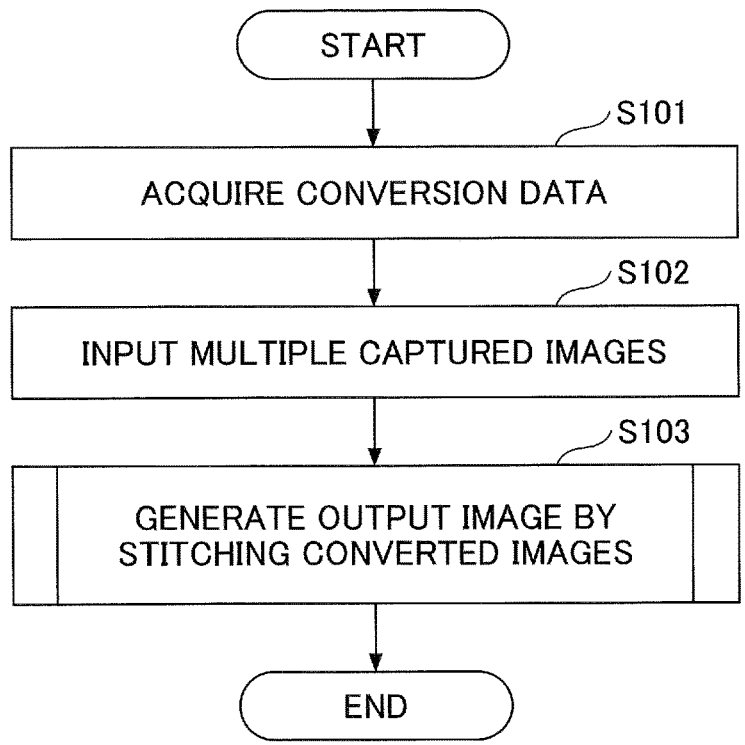
FIG. 12 is a flowchart illustrating an example overall process implemented by the information processing apparatus of the image processing system according to an embodiment of the present invention.

FIG. 12 is a flowchart illustrating an example overall process implemented by the information processing apparatus of the image processing system according to an embodiment of the present invention. For example, in the image processing system, the PC may perform the following process operations with respect to captured images input from the omnidirectional camera 1.

In step S101, the PC acquires conversion data. Note that the PC acquires the conversion data for each image capturing element. That is, in a case where the omnidirectional camera 1 as illustrated in FIG. 1 is connected to the PC, for example, the PC acquires conversion data for each of the two image capturing elements 1H3 and 1H4. In the following description, the conversion data for the first image capturing element 1H3 as illustrated in FIG. 1 is referred to as "first conversion data". Similarly, the conversion data for the second image capturing element 1H4 as illustrated in FIG. 1 is referred to as "second conversion data". That is, in the present example, the PC acquires the first conversion data and the second conversion data from the omnidirectional camera 1.

Also, because the first conversion data and the second conversion data differ with respect to each omnidirectional camera, when a different omnidirectional camera is connected to the PC, the PC acquires first conversion data and second conversion data from the newly connected omnidirectional camera.

In the following, an image generated by conversion based on the first conversion data, namely, an image generated by converting the first captured image is referred to as "first converted image". On the other hand, an image generated by conversion based on the second conversion data, namely, an image generated by converting the second captured image is referred to as "second converted image".

Note that the conversion data may be stored in association with a specific image capturing apparatus such as an omnidirectional camera. That is, the PC may acquire and store the first conversion data and the second conversion data for each image capturing apparatus. For example, the conversion data may include identification data, such as an ID (identification) or an identification number, that is capable of uniquely identifying each omnidirectional camera. When an omnidirectional camera is connected to the PC, the PC may acquire the identification number of the connected omnidirectional camera and compare the acquired identification number of the connected omnidirectional camera with identification data (identification number) included in previously acquired conversion data stored in the PC.

If conversion data associated with an identification number that is identical to the identification number of the connected omnidirectional camera is stored in the PC, the PC can use the conversion data identified by the relevant identification data. In other words, based on the identification data included in the conversion data, the PC can use appropriate conversion data for each image capturing apparatus.

For example, the conversion data may be data in a LUT (Lookup Table) format as represented by Table 1 below.

TABLE 1

| COORDINATES AFTER CONVERSION | | COORDINATES BEFORE CONVERSION | |
|---|---|---|---|
| θ (pixel) | φ (pixel) | x (pixel) | y (pixel) |
| 0 | 0 | | |
| 1 | 0 | | |
| 2 | 0 | | |
| . | . | . | . |
| . | . | . | . |
| . | . | . | . |
| 3597 | 1799 | | |
| 3598 | 1799 | | |
| 3599 | 1799 | | |

As indicated in the above Table 1, the conversion data is data associating coordinates before conversion with coordinates after conversion. Also, the conversion data differs for each omnidirectional camera. Parameters of an omnidirectional camera differ from device to device. As such, the conversion data, which is affected by the parameters, also differs for each omnidirectional camera. Specifically, the conversion data may be a so-called mesh file or the like. That is, the conversion data may be data used for texture mapping in OpenGL (registered trademark), for example. Also, when a captured image is converted based on conversion data, the captured image is arranged as a part of an output image and is subjected to image processing such as distortion correction. Note that image processing using the conversion data will be described in detail below with reference to step S103.

Referring back to FIG. 12, in step S102, the PC inputs a plurality of captured images. That is, in step S102, a plurality of captured images are input from an omnidirectional camera that is connected to the PC. Specifically, in the example case where the omnidirectional camera 1 of FIG. 1 is connected, the PC inputs two captured images. That is, in the example case where the omnidirectional camera 1 of FIG. 1 is connected, the PC inputs the first captured image and the second captured image.

In step S103, the PC stitches converted images of the input captured images and generates an output image. First, in step S103, the PC converts the input captured images based on conversion data to generate converted images. Specifically, the PC may perform the following conversion process, for example.

Figure 13:
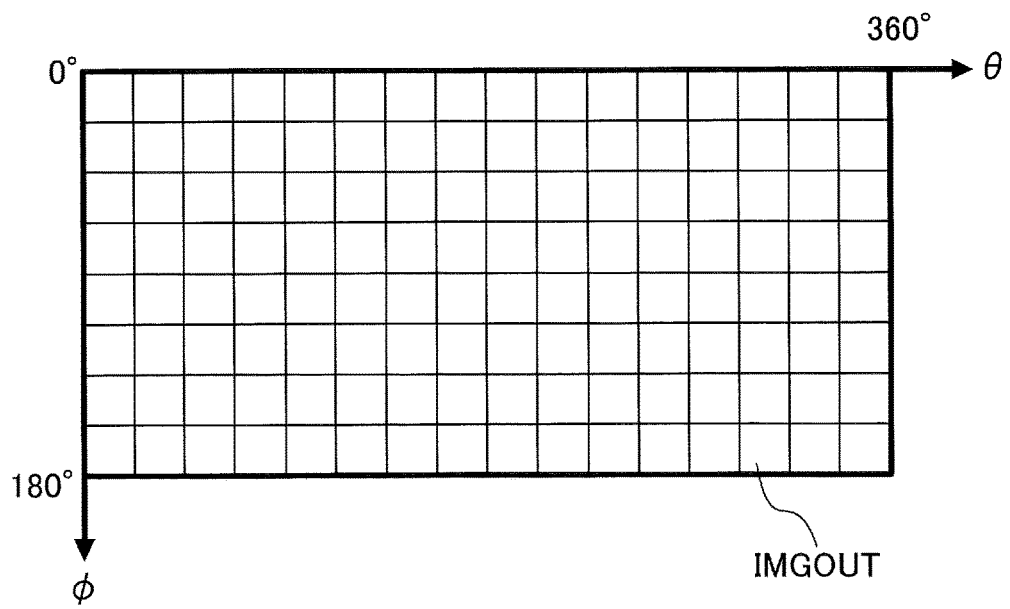
FIG. 13 is a diagram illustrating an example output image according to an embodiment of the present invention.
Figure 14:
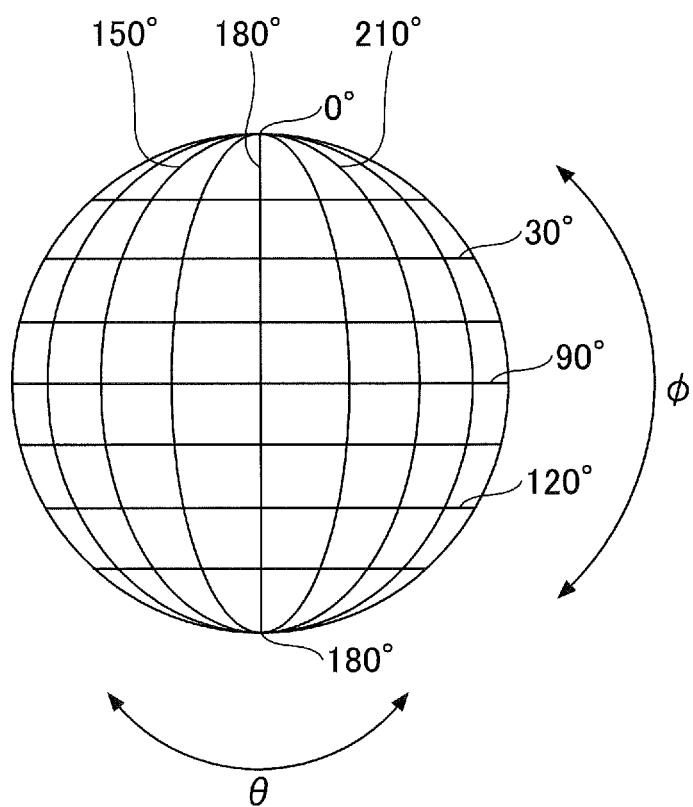
FIG. 14 is a diagram illustrating an example captured image according to an embodiment of the present invention.

FIGS. 13 and 14 are diagrams illustrating examples of an output image and a captured image according to an embodiment of the present invention. For example, in step S103 of FIG. 12, the PC may generate and output an output image IMGOUT in a format as illustrated in FIG. 13. That is, the output image IMGOUT may be an equirectangular image, for example. On the other hand, in step S102 of FIG. 12, the PC may input a plurality of captured images in the format as illustrated in FIG. 14, for example. As can be appreciated from FIGS. 13 and 14, each pixel of the captured image and the output image is defined by coordinate values indicating an angle with respect to a predetermined axis (hereinafter referred to as "vertical angle $\varphi$") and an angle orthogonal to the vertical angle $\varphi$ (hereinafter referred to as "horizontal angle $\theta$"). In the following, it is assumed that the horizontal angle $\varphi$ is in the range from 0° to 360°. Note, however, that the horizontal angle $\theta$ may also be in the range from −180° to 180°, for example. Further, it is assumed that the vertical angle $\varphi$ is in the range from 0° to 180°. Note, however, that the vertical angle $\varphi$ may also be in the range from −90° to 90°, for example. When each pixel of each captured image is converted based on the conversion data as indicated in the above Table 1, converted images are generated, and when the generated converted images are stitched, an output image is generated. Specifically, a conversion process as described below may be performed, for example.

Figure 15:
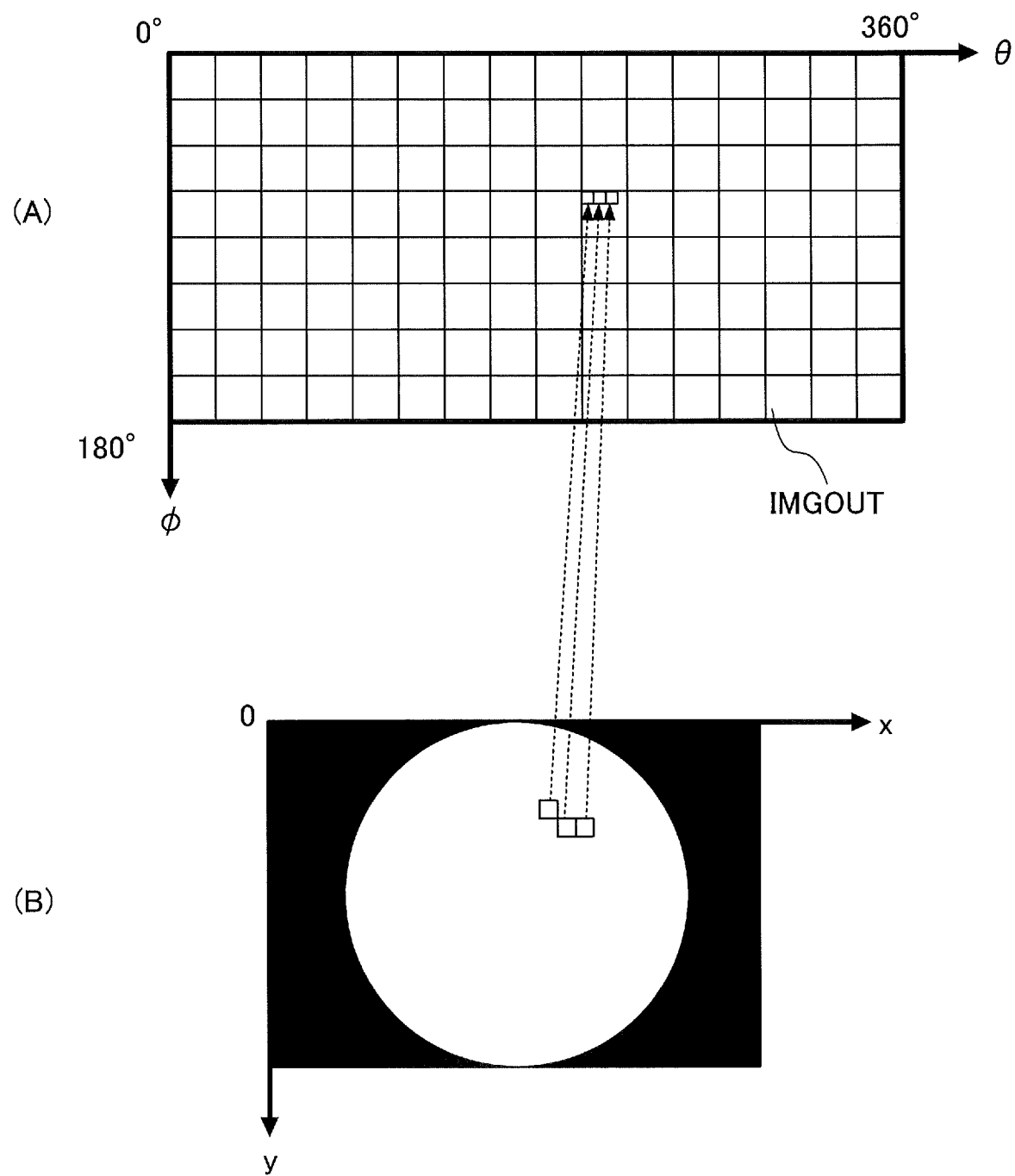
FIG. 15 is a diagram illustrating an example conversion process using conversion data according to an embodiment of the present invention.

FIG. 15 is a diagram illustrating an example conversion process using conversion data according to an embodiment of the present invention. Specifically, an example of the output image IMGOUT is illustrated in (A) of FIG. 15. On the other hand, an example of a captured image is illustrated in (B) of FIG. 15. First, the PC converts the captured image based on the conversion data as indicated in the above Table 1. As illustrated in FIG. 15, based on the conversion data as indicated in the above Table 1, each pixel of the captured image is mapped onto corresponding coordinates on the output image IMGOUT by the PC. That is, the conversion data as indicated in the above Table 1 is data for projecting pixels of a captured image defined by a plane coordinate system (x, y) onto corresponding pixel positions of a spherical coordinate system ($\theta$, $\varphi$). Note that the conversion data may also reflect the projection relationship based on the lens specification and the like as described above with reference to FIGS. 4 and 5, for example. That is, by performing image conversion based on the conversion data, image distortion, aberrations, and the like may be corrected. Note that a conversion process according to an embodiment of the present invention may also include performing rotation conversion as described below, for example.

Figure 16:
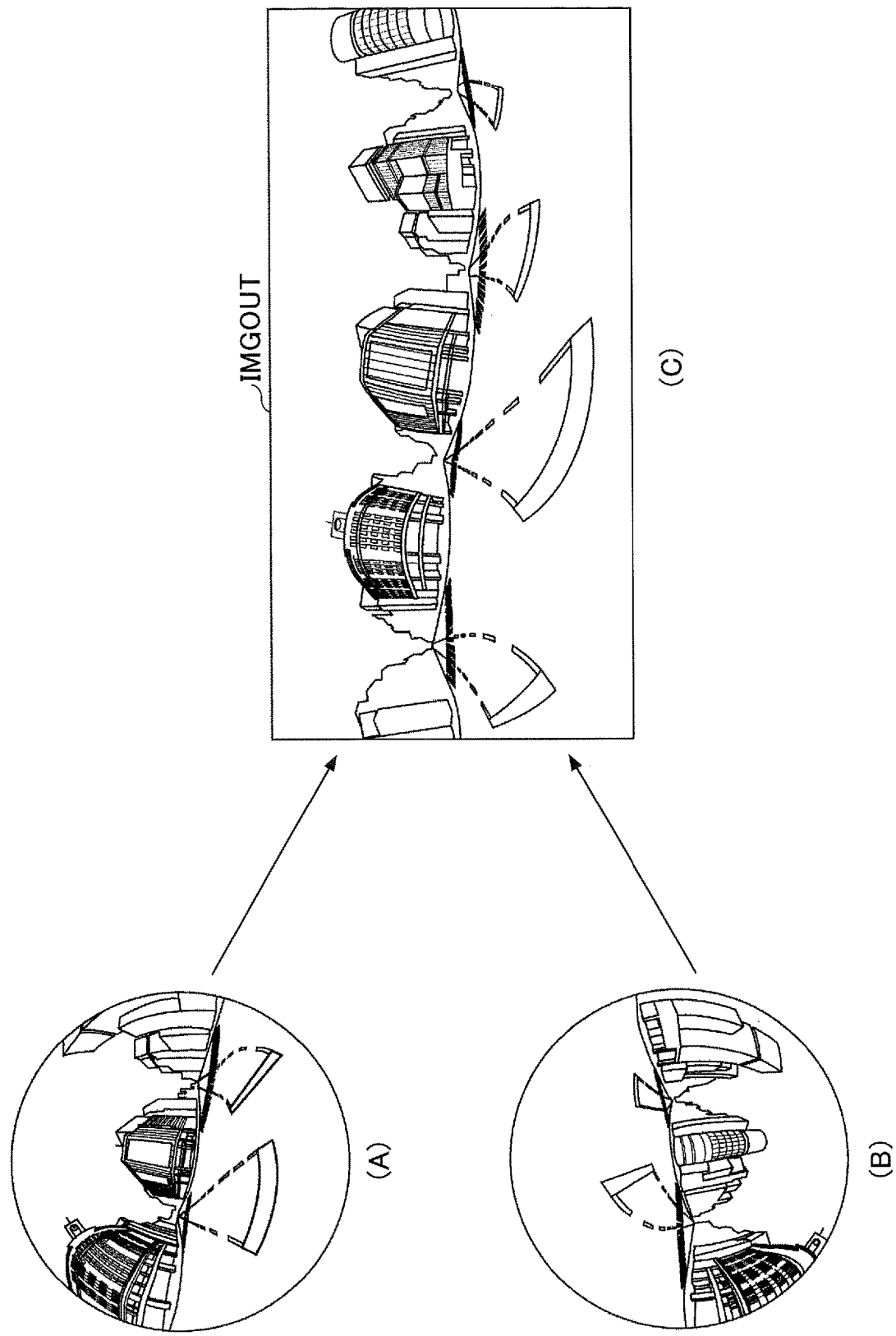
FIG. 16 is a diagram illustrating an example rotation conversion process according to an embodiment of the present invention.

FIG. 16 is a diagram illustrating an example rotation conversion process according to an embodiment of the present invention. In the following, an example where an output image IMGOUT as indicated in (C) of FIG. 16 is output based on captured images as indicated in (A) and (B) of FIG. 16 will be described. As in the illustrated example, depending on the orientation of the first image capturing element 1H3 (FIG. 1) and the second image capturing element 1H4 (FIG. 1), one captured image may, be inverted (upside down) with respect to the other captured image. That is, the upward and downward directions of the captured images may be reversed, for example. In such a case, the captured images may be in a so-called "upside down" state where an object captured in one captured image is inverted (upside down) with respect to an object captured in another captured image. In such a case, the PC may perform rotation conversion for correcting the "upside down" orientation of a captured image. Specifically, in the present example, the PC may further perform rotation conversion for inverting the captured image indicated in (B) of FIG. 16 in order to generate the output image IMGOUT as indicated in (C) of FIG. 16.

Then, the PC may stich the converted images generated based on the conversion data to generate an output image and output the generated output image. Note that the stitching process may include process operations as described below, for example.

Figure 17:
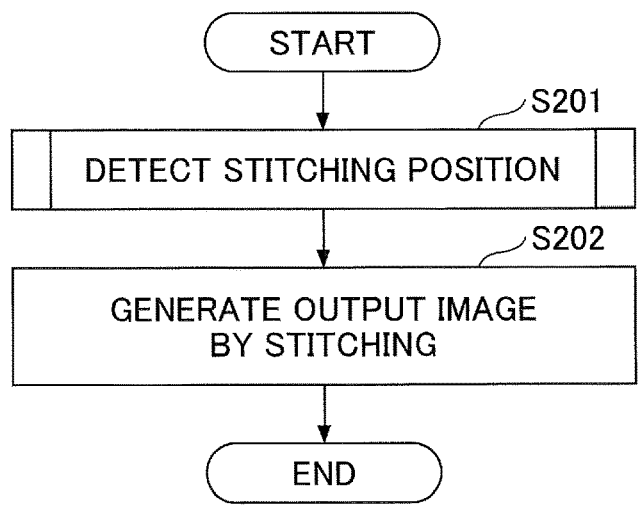
FIG. 17 is a flowchart illustrating an example stitching process implemented by the information processing apparatus according to an embodiment of the present invention.

FIG. 17 is a flowchart illustrating an example stitching process implemented by the information processing apparatus according to an embodiment of the present invention. Note that the process of FIG. 17 may correspond to the process of step S103 in FIG. 12, for example.

In step S201, the PC detects a stitching position. For example, a stitching position of each converted captured image may be determined by detecting the pixels representing an object captured in the overlapping region 2 illustrated in FIG. 2. Specifically, detection of the stitching position may be implemented by the following process operations, for example.

Figure 18:
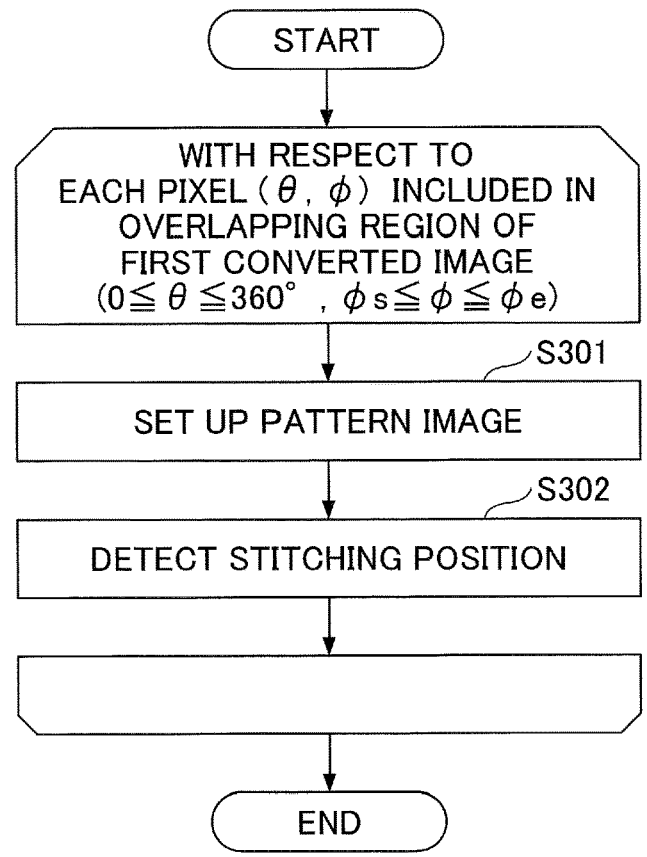
FIG. 18 is a flowchart illustrating an example stitching position detection process implemented by the information processing apparatus according to an embodiment of the present invention.

FIG. 18 is a flowchart illustrating an example stitching position detection process implemented by the information processing apparatus according to an embodiment of the present invention. For example, the stitching position detection process of FIG. 18 may be performed in step S201 of FIG. 17 to detect a stitching position at which the first converted image and the second converted image are stitched. In the illustrated example, steps S301 and S302 are repeated for each pixel ($\theta$, $\varphi$) included in the overlapping region 2 (FIG. 2) of the first converted image. Note that in the present example, it is assumed that a pixel ($\theta$, $\varphi$) included in the overlapping region 2 has a horizontal angle $\theta$ (FIG. 13) defined by the spherical coordinate system ($\theta$, $\varphi$) that is in the range from "0°" to "360°". Also, it is assumed that a pixel ($\theta$, $\varphi$) included in the overlapping region 2 has a vertical angle $\varphi$ (FIG. 13) defined by the spherical coordinate system ($\theta$, $\varphi$) that is in the range from "$\varphi s$" to "$\varphi e$". Note that "$\varphi s$" and "$\varphi e$" respectively represent a start angle and an end angle of the overlapping region 2 that are defined in advance based on the total angle of view of the lens. That is, "φs" and "φe" are preset values that are used to perform pattern matching of the pixels (θ, φ) included in the overlapping region 2 as described below.

In step S301, the PC sets an image to be searched (hereinafter referred to as a "pattern image") in pattern matching. For example, a pattern image as described below may be set up.

Figure 19:
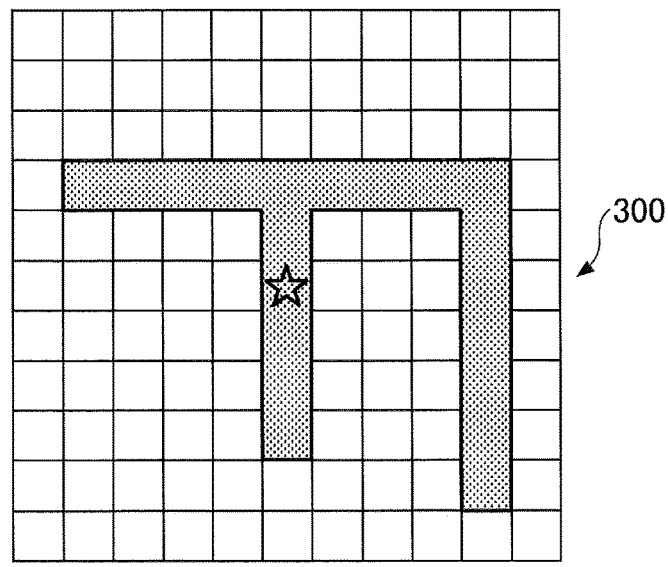
FIG. 19 is a first diagram illustrating pattern matching in the stitching position detection process according to an embodiment of the present invention.
Figure 20:
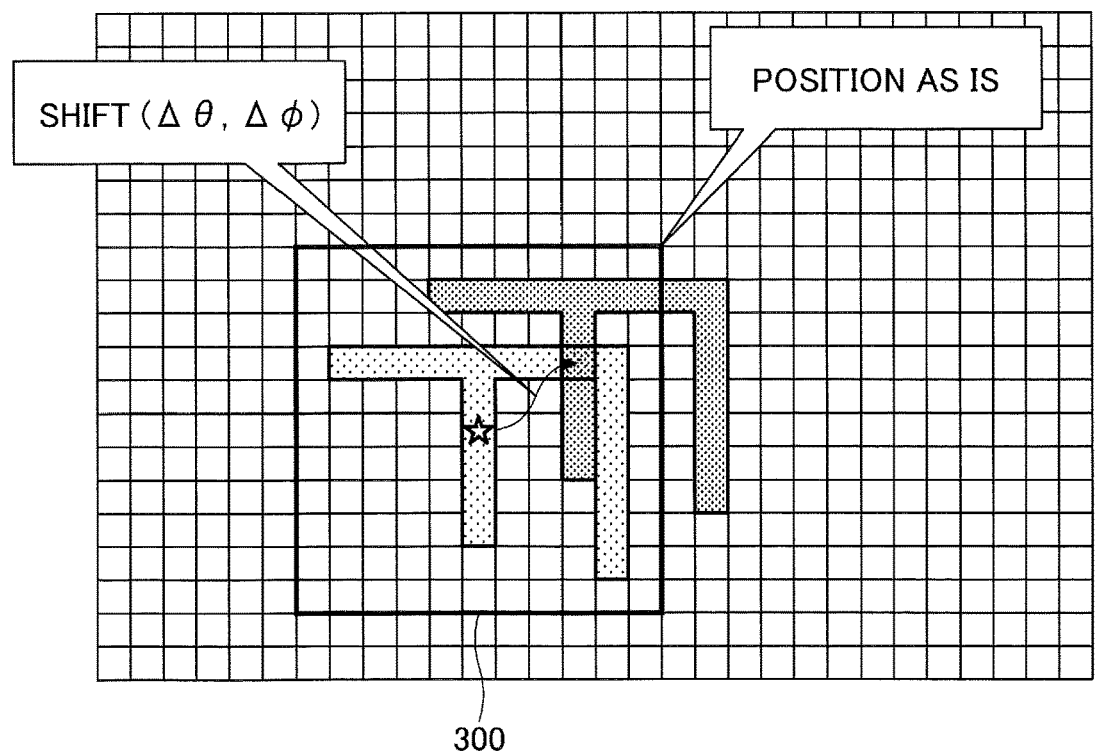
FIG. 20 is a second diagram illustrating pattern matching in the stitching position detection process according to an embodiment of the present invention.

FIGS. 19 and 20 are diagrams illustrating an example of pattern matching implemented in the stitching position detection process according to an embodiment of the present invention. In the following, an example where a pattern image 300 as illustrated in FIG. 19 is set up will be described. Specifically, for example, a 11×11 pixels image with a pixel indicated by a star mark (☆) as the center pixel as illustrated in FIG. 19 may be cut out from the overlapping region 2 (FIG. 2) of the first converted image and set up as the pattern image 300. In the spherical coordinate system (θ, φ), the two ends of the horizontal angle θ (i.e., "0°" and "360°") are connected to each other, and as such, it is assumed that pixels at one end are connected to pixels at the other end.

Referring back to FIG. 18, in step S302, the PC detects the stitching position. For example, the stitching position may be detected in the following manner based on the pattern image set up in step S301.

FIG. 20 illustrates an example method of detecting the stitching position by pattern matching in the overlapping region 2 of the second converted image. For example, the stitching position may be indicated by a shift (Δθ, Δφ) as illustrated in FIG. 20. Specifically, first, the PC may move the pattern image 300 of FIG. 19 in the horizontal angle θ direction and the vertical angle φ direction (horizontal and vertical directions in FIG. 20) within the overlapping region 2 of the second converted image. Then, the PC may calculate a similarity used in template matching, for example, to measure the similarity between pixels of the pattern image 300 and the second converted image, and calculate the distance between the position at which a high similarity can be obtained and the current position of the pattern image 300 ("position as is" in FIG. 20). The similarity may be calculated using the SAD (Sum of Absolute Difference) method or the SSD (Sum of Squared Difference) method, for example. Alternatively, the similarity may be calculated using the POC (Phase-Only Correlation) method or the ZNCC (Zero-Normal Normalized Cross-Correlation) method, for example. The shift (Δθ, Δφ) indicates the distance calculated in the above-described manner. That is, in FIG. 20, when the pattern image 300 located at the "position as is" is moved by a distance indicated by the shift (Δθ, Δφ), the pattern image 300 may match the image indicated by the overlapping region 2 of the second converted image. In this way, the PC can detect the position indicated by the calculated shift (Δθ, Δφ) as the stitching position in the present example.

Referring back to FIG. 17, in step S202, the PC generates an output image by stitching converted images. For example, the PC may generate an output image by stitching the first converted image and the second converted image as described below.

Figure 21:
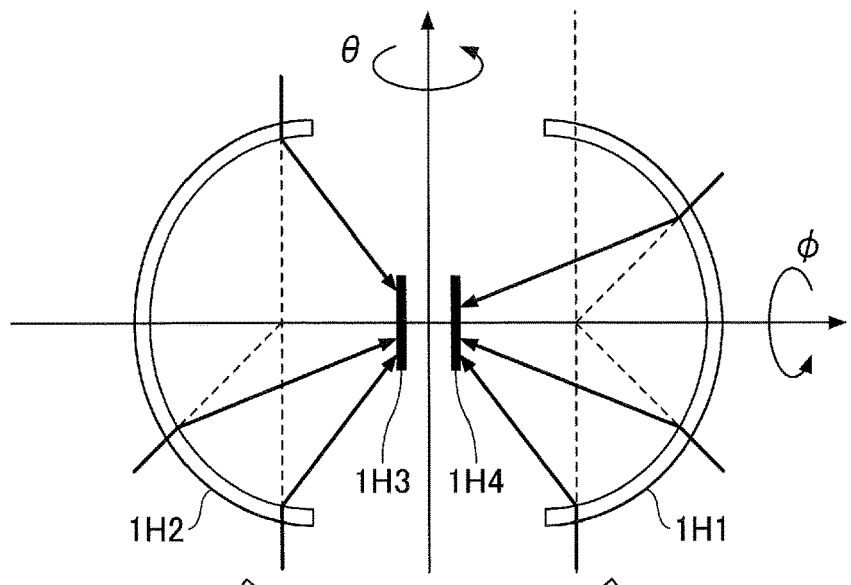
FIG. 21 is a diagram illustrating an example process of generating an output image according to an embodiment of the present invention.
Figure 21:
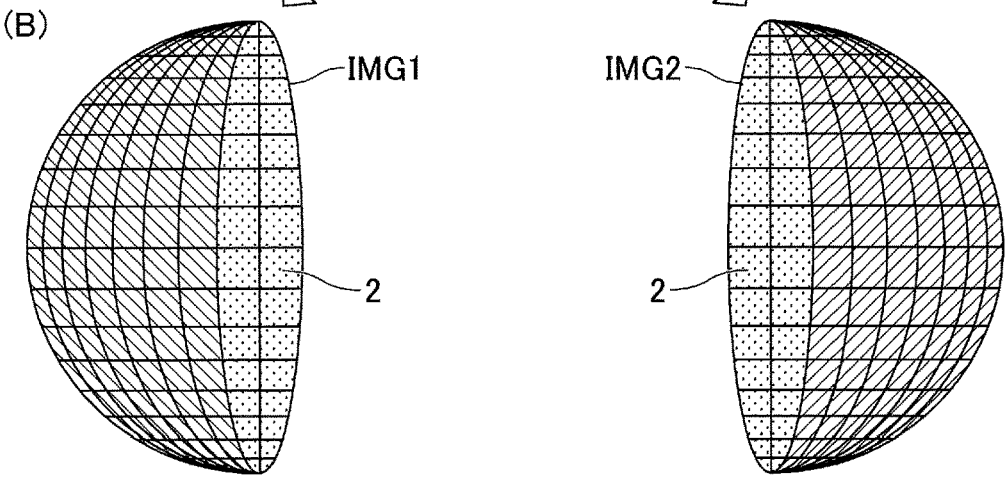
Figure 21:
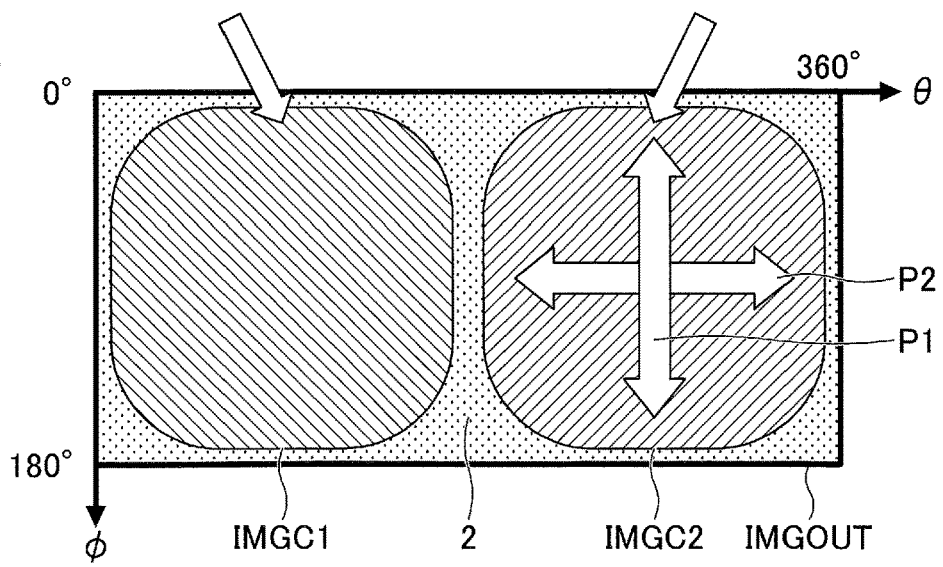

FIG. 21 is a diagram illustrating an example process of generating an output image according to an embodiment of the present invention. In the following, an example case where the PC converts and stitches a first captured image IMG1 and a second captured image IMG2 to generate an output image IMGOUT as illustrated in FIG. 21 will be described.

In FIG. 21, the first captured image IMG1 and the second captured image IMG2 are respectively converted into a first converted image IMGC1 and a second converted image IMGC2 based on corresponding conversion data, and the first converted image IMGC1 and the second converted image IMGC2 are arranged to constitute a part of the output image IMGOUT.

As illustrated in FIG. 21, to represent an image indicated in the output image IMGOUT that corresponds to a region represented by pixels only exiting in the first captured image IMG1 or the second captured image IMG2, pixels included in the first captured image IMG1 or the second captured image IMG2 are used. On the other hand, to represent an image indicated in the output image IMGOUT that corresponds to a region represented by pixels existing in both the first captured image IMG1 and the second captured image IMG2, namely, the overlapping region 2, pixels of the first captured image IMG1 and the second captured image IMG2 may be blended or otherwise processed and used. Note that pixels may be corrected when used as pixels of the output image IMGOUT, for example.

When the stitching position is detected by calculating the shift as described above, for example, the PC arranges the first converted image IMGC1 and the second converted image IMGC2 so that pixels of the first converted image IMGC1 and the second converted image IMGC2 in the overlapping region 2 are stitched at the detected stitching position. Note that the stitching position may be adjusted by a user operation, for example.

In the image processing system 10 having the configuration as illustrated in FIG. 10, because the PC 50 includes conversion data, after converting captured images, the PC 50 can adjust where the converted images are to be stitched in generating an output image. Because an image capturing apparatus having a plurality of optical systems, such as the omnidirectional camera 1, has different optical systems, parallax is often present in the captured images. As a result, for example, stitching positions may vary depending on the distance of an imaged object captured in each of the captured images. Specifically, stitching positions often differ between a case where the distance of an object captured in one captured image is at an infinite distance and the distance of the object in another captured image is at a close distance and a case where the captured distance in both of the captured images is at an infinite distance, for example. Thus, in a preferred embodiment, the stitching position is arranged to be adjustable.

To adjust the stitching position, for example, first, the user may view the output image IMGOUT that is output and input a moving amount by which one of the converted images is to be moved. In the following, an example in which the position of the second converted image IMGC2 is moved to adjust the stitching position as illustrated in FIG. 21 will be described. Note that the adjustment may also be made by moving the position of the first converted image IMGC1.

For example, in the example illustrated in FIG. 21, the moving amount may include a value indicating a moving amount for moving the position of the second converted image IMGC2 in the vertical angle φ direction (hereinafter referred to as "first moving amount P1") and a value indicating a moving amount for moving the position of the second converted image IMGC2 in the horizontal angle θ direction (hereinafter referred to as "second moving amount P2"). The PC inputs at least one of the first moving amount P1 and the second moving amount P2. For example, when the image output unit VE (FIG. 10) of the PC displays a GUI such as a scroll bar for inputting the moving amount and the user UR inputs an operation via the displayed GUI, the PC can input the moving amount. In turn, the PC can arrange the second converted image IMGC2 at the position indicated by the input moving amount. In this way, the PC can accurately stitch images even in the presence of parallax and the like.

In a preferred embodiment, at least the second moving amount P2 is input to adjust the stitching position. This is because shifts and deviations in the horizontal angle θ direction are more likely to occur due to the presence of parallax and the like. That is, the PC preferably adjusts the amount of overlap between converted images based on an input of the second moving amount P2. In this way, when the second moving amount P2 is input to the PC and adjustment in the horizontal angle θ direction is performed, the PC can stitch images with higher accuracy even in the presence of parallax and the like.

<Functional Configuration Example>

Figure 22:
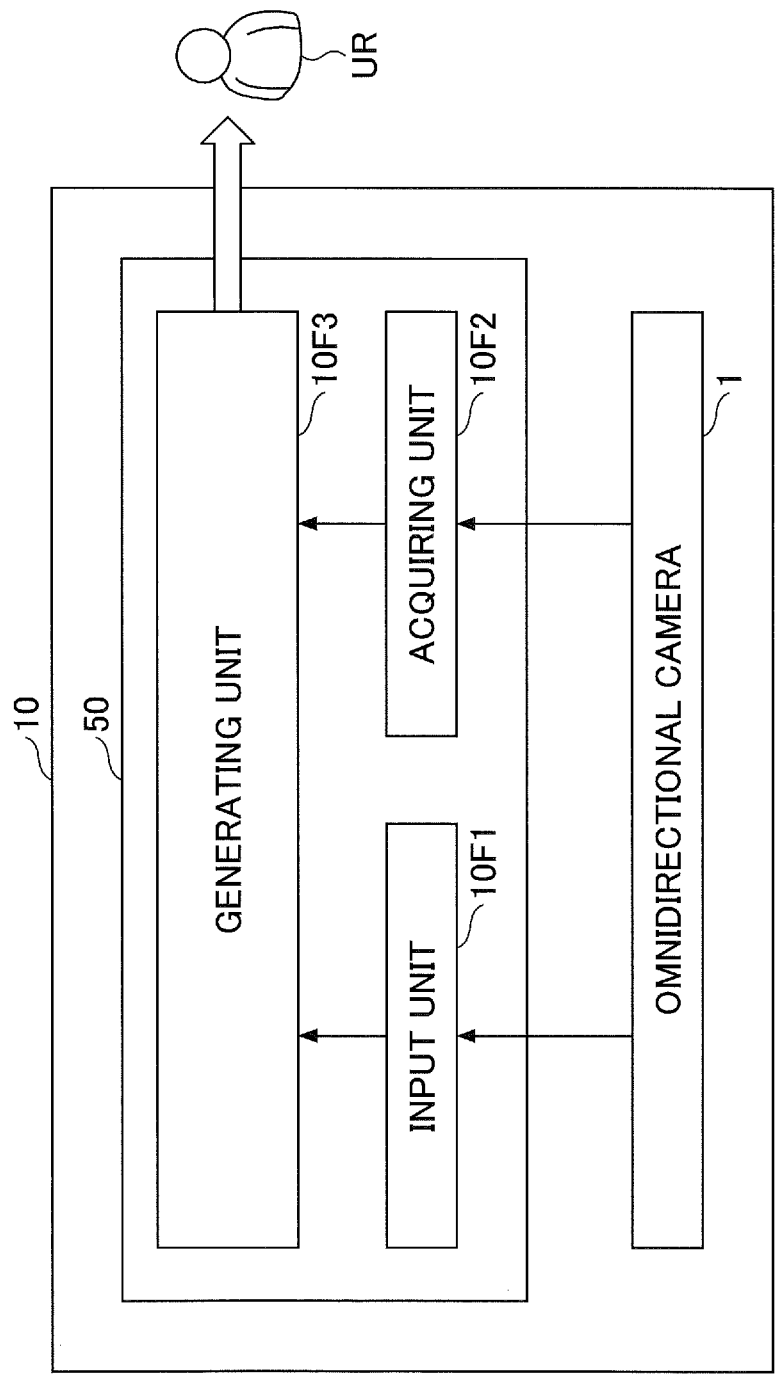
FIG. 22 is a functional block diagram illustrating an example functional configuration of the image processing system according to an embodiment of the present invention.

FIG. 22 is a functional block diagram illustrating an example functional configuration of the image processing system 10 according to an embodiment of the present invention. For example, the image processing system 10 may include the omnidirectional camera 1 as an example of an image capturing apparatus, and a PC 50 as an example of an information processing apparatus. In the illustrated example, the PC 50 includes an input unit 10F1, an acquiring unit 10F2, and a generating unit 10F3.

The input unit 10F1 inputs captured images including at least a first captured image and a second captured image from the omnidirectional camera 1. The input unit 10F1 may be implemented by the communication device 50H6 (FIG. 11) and/or the input device 50H7 (FIG. 11), for example.

The acquiring unit 10F2 acquires first conversion data used for converting the first captured image and second conversion data used for converting the second captured image. The acquiring unit 10F2 may be implemented by the communication device 50H6 (FIG. 11) and/or the input device 50H7 (FIG. 11), for example.

The generating unit 10F3 generates an output image by stitching converted images generated by converting the first captured image based on the first conversion data and the second captured image based on the second conversion data. The generating unit 10F3 may be implemented by the CPU 50H1 (FIG. 11), for example.

In the image processing system 10, the acquiring unit 10F2 of the PC 50 acquires the first conversion data and the second conversion data from the omnidirectional camera 1 in advance. Thus, the PC 50 can convert the first captured image and the second captured image input by the input unit 10F1 using the conversion data acquired in advance. In turn, the generating unit 10F3 of the PC 50 can generate an output image by stitching the converted images. Note that conversion data is data reflecting parameters and the like of each image capturing apparatus. As such, the conversion data differs for each image capturing apparatus. Thus, by configuring the PC 50 as illustrated in FIG. 22 so that the PC can acquire conversion data for each image capturing apparatus in order to perform conversion in accordance with the parameters and the like of each image capturing apparatus, the PC 50 can suitably convert each captured image and stitch a plurality of converted images with higher accuracy to generate an output image. In turn, the image processing system 10 can output the generated output image to the user UR.

Note that an embodiment according to the present invention may be implemented by a program including firmware. That is, an embodiment according to the present invention may be implemented by a program for causing an information processing apparatus or an image processing system having one or more information processing apparatuses to execute an image processing method. Further, the program may be installed in an information processing apparatus or the like via a recording medium, a network, or the like. The recording medium may be a computer-readable recording medium such as an optical disk, for example. Further, the computer-readable recording medium may be a portable recording medium such as a USB (Universal Serial Bus) memory or a semiconductor memory such as a flash memory, for example.

Although the present invention has been described above with reference to certain illustrative embodiments, the present invention is not limited to these embodiments, and numerous variations and modifications may be made in light of the above teachings without departing from the scope of the present invention. It is therefore to be understood that, within the scope of the appended claims, the disclosure of the present specification may be practiced otherwise than as specifically described herein.

As can be appreciated by those skilled in the computer arts, the present invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits (ASIC) or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. Processing circuitry for executing one or more functions of the described embodiments may be implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

What is claimed is:

1. An image processing system comprising:
an image capturing apparatus configured to generate a plurality of captured images; and
at least one information processing apparatus connected to the image capturing apparatus;
wherein the information processing apparatus includes processing circuitry configured to
input at least a first captured image and a second captured image from among the plurality of captured images;
acquire first conversion data to be used for converting the first captured image and second conversion data to be used for converting the second captured image; and
generate an output image by stitching a first converted image generated by converting the first captured image based on the first conversion data and a second converted image generated by converting the second captured image based on the second conversion data,
wherein a coordinate value of each pixel included in the first captured image, the first captured image, and the output image is specified by an angle with respect to a predetermined axis as a vertical angle and an angle orthogonal to the vertical angle as a horizontal angle,
with respect to a movement amount when moving at least one of the first converted image and the second converted image, a movement amount in the vertical angle direction is defined as a first movement amount, and a movement amount in the horizontal angle direction is defined as a second movement amount, and
a user is allowed to input one of the first movement amount and the second movement amount, and the information processing apparatus adjusts a stitching position for stitching the first converted image and the second converted image by setting another movement amount of the first movement amount and the second movement amount based on the one movement amount.

2. The image processing system according to claim 1, wherein the processing circuitry acquires the first conversion data and the second conversion data for each image capturing apparatus of a plurality of image capturing apparatuses.

3. The image processing system according to claim 1, wherein the first conversion data and the second conversion data include identification data capable of identifying the image capturing apparatus; and
the first captured image and the second captured image are converted using the first conversion data and the second conversion data that include the identification data corresponding to the image capturing apparatus.

4. The image processing system according to claim 1, wherein the processing circuitry is further configured to adjust an amount of overlap between the first converted image and the second converted image based on the input moving amount for moving at least one of the first converted image and the second converted image.

5. The image processing system according to claim 1, wherein the image capturing apparatus includes a fish-eye lens or a wide-angle lens.

6. The image processing system according to claim 1, wherein
the first conversion data and the second conversion data include data for arranging the first captured image and the second captured image in a part of the output image and implementing distortion correction on the first captured image and the second captured image.

7. The image processing system according to claim 1, wherein the processing circuitry allows the user to input the second movement amount, and adjusts the position for stitching the first converted image and the second converted image by setting the first movement amount.

8. An image processing method implemented by an image processing system that includes an image capturing apparatus configured to generate a plurality of captured images and at least one information processing apparatus connected to the image capturing apparatus, the image processing method comprising:
inputting a first captured image and a second captured image from among the plurality of captured images from the image capturing apparatus;
acquiring first conversion data to be used for converting the first captured image and second conversion data to be used for converting the second captured image; and
generating an output image by stitching a first converted image generated by converting the first captured image based on the first conversion data and a second converted image generated by converting the second captured image based on the second conversion data,
wherein a coordinate value of each pixel included in the first captured image, the first captured image, and the output image is specified by an angle with respect to a predetermined axis as a vertical angle and an angle orthogonal to the vertical angle as a horizontal angle,
with respect to a movement amount when moving at least one of the first converted image and the second converted image, a movement amount in the vertical angle direction is defined as a first movement amount, and a movement amount in the horizontal angle direction is defined as a second movement amount, and
a user is allowed to input one of the first movement amount and the second movement amount, and the information processing apparatus adjusts a stitching position for stitching the first converted image and the second converted image by setting another movement amount of the first movement amount and the second movement amount based on the one movement amount.

9. The image processing method according to claim 8, wherein the image processing system allows the user to input the second movement amount, and adjusts the position for stitching the first converted image and the second converted image by setting the first movement amount.

10. A non-transitory computer-readable medium storing a program to be executed by a computer including an image capturing apparatus configured to generate a plurality of captured images and at least one information processing apparatus connected to the image capturing apparatus, the program when executed causing the computer to implement an image processing method comprising:
inputting a first captured image and a second captured image from among the plurality of captured images from the image capturing apparatus;
acquiring first conversion data to be used for converting the first captured image and second conversion data to be used for converting the second captured image; and
generating an output image by stitching a first converted image generated by converting the first captured image based on the first conversion data and a second converted image generated by converting the second captured image based on the second conversion data,
wherein a coordinate value of each pixel included in the first captured image, the first captured image, and the output image is specified by an angle with respect to a predetermined axis as a vertical angle and an angle orthogonal to the vertical angle as a horizontal angle, with respect to a movement amount when moving at least one of the first converted image and the second converted image, a movement amount in the vertical angle direction is defined as a first movement amount, and a movement amount in the horizontal angle direction is defined as a second movement amount, and a user is allowed to input one of the first movement amount and the second movement amount, and the information processing apparatus adjusts a stitching position for stitching the first converted image and the second converted image by setting another movement amount of the first movement amount and the second movement amount based on the one movement amount.

11. The non-transitory computer-readable medium according to claim 10, wherein the program causes the computer to allow the user to input the second movement amount, and adjusts the position for stitching the first converted image and the second converted image by setting the first movement amount.

* * * * *